United States Patent
Fok et al.

(10) Patent No.: US 7,788,316 B2
(45) Date of Patent: Aug. 31, 2010

(54) EFFICIENT SERVER HANDLING OF MULTIPLE REQUESTS FROM A WEB BROWSER

(75) Inventors: Madeline K. M. Fok, Toronto (CA); Victor Chan, Thornhill (CA); Mark W. Hubbard, Maple (CA); Darshanand Khusial, Mississauga (CA)

(73) Assignee: International Business Machines Corporation, Armonk, NY (US)

( * ) Notice: Subject to any disclaimer, the term of this patent is extended or adjusted under 35 U.S.C. 154(b) by 1077 days.

(21) Appl. No.: 10/391,069

(22) Filed: Mar. 18, 2003

(65) Prior Publication Data

US 2003/0187995 A1 Oct. 2, 2003

(30) Foreign Application Priority Data

Mar. 27, 2002 (CA) .................................. 2379090

(51) Int. Cl.
*G06F 15/16* (2006.01)
(52) U.S. Cl. .................................................. 709/203
(58) Field of Classification Search ................ 709/203, 709/229, 227
See application file for complete search history.

(56) References Cited

U.S. PATENT DOCUMENTS

| | | | | |
|---|---|---|---|---|
| 5,894,554 | A | 4/1999 | Lowery et al. | 395/200.33 |
| 5,983,262 | A | 11/1999 | Kukkal | 709/204 |
| 6,038,596 | A * | 3/2000 | Baldwin et al. | 709/219 |
| 6,098,093 | A * | 8/2000 | Bayeh et al. | 709/203 |
| 6,151,599 | A | 11/2000 | Shrader et al. | 707/9 |
| 6,154,751 | A | 11/2000 | Ault et al. | 707/201 |
| 6,237,035 | B1 * | 5/2001 | Himmel et al. | 709/224 |
| 6,253,325 | B1 | 6/2001 | Steele et al. | 713/201 |
| 6,510,469 | B1 * | 1/2003 | Starnes et al. | 709/247 |
| 6,546,443 | B1 * | 4/2003 | Kakivaya et al. | 710/200 |
| 6,710,786 | B1 * | 3/2004 | Jacobs et al. | 715/744 |
| 6,725,252 | B1 * | 4/2004 | Himmel et al. | 709/203 |

(Continued)

FOREIGN PATENT DOCUMENTS

| JP | 11027571 | 4/1999 |
|---|---|---|
| JP | 00809880 | 3/2000 |

OTHER PUBLICATIONS

Baker, SM. et al.; *Scalable Web Server Design for Distributed dat Management*, IEEE online library, 2002.

(Continued)

*Primary Examiner*—Philip C Lee
*Assistant Examiner*—Bradford F Fritz
(74) *Attorney, Agent, or Firm*—Coats & Bennett PLLC

(57) ABSTRACT

A system and method for handling multiple identical requests received by a server from a client by a web application server. When multiple requests for the same URL are received by a web application server from the same client browser which results in the allocation of multiple threads on the server to handle the requests, a response to the client is obtained from the processing carried out by the first thread launched by the web application server. Results of the initial thread are passed to the client using the last opened connection between the client and server relating to the client's request for the URL. Other threads are placed in a wait state and are deallocated, at the earliest opportunity, where possible.

16 Claims, 7 Drawing Sheets

U.S. PATENT DOCUMENTS

| | | | |
|---|---|---|---|
| 6,920,489 B1 * | 7/2005 | Yamamoto et al. | 709/219 |
| 7,310,783 B2 * | 12/2007 | Pagan | 715/840 |
| 2003/0187991 A1 * | 10/2003 | Lin et al. | 709/227 |
| 2004/0059733 A1 * | 3/2004 | Li | 707/8 |

OTHER PUBLICATIONS

Ahn, You-Jung et al.; *A Placement Policy to Maximize the Number of Concurrent Video Streams Supported in Clustered Video-On-Demand Servers*, IEEE Online Librry, 1999.

* cited by examiner

EFFICIENT SERVER HANDLING OF MULTIPLE REQUESTS FROM A WEB BROWSER

FIELD OF THE INVENTION

The present invention relates generally to web application server handling of requests received by a server from a web browser, and more specifically the management of web application server resources in handling multiple requests.

BACKGROUND OF THE INVENTION

A typical e-commerce Internet website has a web server and an application server, collectively referred to as a web application server. The web server acts as a front end to receive requests from the customer's web browser, or client. These requests can require the execution of complex business logic, which is typically handled by a back end application server. The application server carries out any necessary processing and generates output which is delivered via the web server back to the web browser in the form of a response.

Requests in the e-commerce context are typically initiated when the customer clicks or otherwise activates a hyperlink (link), button, or other device on a web page displayed by the client. The request usually contains a universal resource locator (URL) identifying a resource located on the web application server, and other information to identify the client or the nature of the request. When a request is submitted by a client to a web application server for processing, a connection is established between the web server and the client so that the server can return the response to the client over an open connection between the server and client, in accordance with Internet protocol. Because the protocol used to handle communications between clients and servers on the Internet (HTTP, or hypertext transfer protocol) is stateless, it is difficult to synchronize client-server communications. Under standard HTTP protocols, when a client submits a new request to a web application server while the server is still processing a previous request from the same client, the connection between the server and the client associated with the previous request is closed and a new connection for providing a response to the new request is established. The web application server will start processing the business (or application) logic associated with the new request. The server is unable to detect that the connection has been closed for the previous request. Therefore, at the same time the application server will continue to process the business logic associated with the previous request. This results in a waste of server resources because there is no open connection to which to write the result of the previous request back to the browser.

In particular, where the server requires a non-trivial amount of time to process the previous (or first) request, before a response is sent to the browser the customer may initiate multiple requests. These multiple requests may be initiated by multiple clicks on the same link or button on a web page, or successive activation of different links or buttons on the web page which make the identical request (for example, a graphical link and a text link may initiate the same request). A link typically invokes a command, which usually represents a particular business (application) logic in the application server. Multiple clicks on a particular link will cause the same command to be executed.

These multiple requests result in a waste of resources as each separate request causes the application server to allocate a new thread for each instance where business (application) logic processing is required. A large number of requests caused by a large number of clicks may have the effect of creating a denial of service attack on the server by occupying all available server resources. Multiple requests may also result in unexpected output displayed on the web browser or misleading results for the customer.

For example, in an e-commerce shopping cart scenario, a user might have selected items to be placed in her virtual shopping cart, and then clicked on the checkout button. If the server response is slow due to network conditions, or other reasons, the user might click on the checkout button a number of times, thinking that this will accelerate the checkout process or speed up the loading of the next page. However, when the first checkout request was submitted the server started processing the items in the shopping cart and placed them in a state where checkout processing could not be applied to the items again. Therefore, each subsequent click by the user will generate a request which will result in failures to complete the checkout process. In the meantime, when the first checkout process is complete, the connection between the server and the client for returning the first response to the user will have been closed. As the only valid connection is from the last request whose processing failed, the user will only see a failure of the request. Web application server resources are also wasted on checkout submissions made between the first and last request.

Solutions have been proposed to this problem which make use of either client-side programs or synchronization tokens. Multiple requests through buttons and forms on a web page may be handled by implementing JavaScript programming to handle form submission, but this requires the client browser must be JavaScript-enabled for this solution to function. Moreover, the solution is limited to web page forms. An alternative solution proposed in *Core J2EE Patterns: Best Practices and Design Strategies* by Alur et al. is to provide a synchronization token which is stored by both the client and the server. The token is submitted by the client on every request made through a web page form and must be compared to the token stored on the server before the request is processed. Again, this solution is limited to forms, and does not prevent multiple submissions of identical requests.

BRIEF SUMMARY OF THE INVENTION

Accordingly, the present invention provides a system and method for handling multiple requests for a URL from a client by a web application server. After a first request is sent, other requests for the URL from the client are sent before the first processing of the first request is complete. One aspect of the invention provides a mechanism for avoiding certain of the undesirable effects that occur when multiple requests are received by a server from a client. An aspect of the invention provides that if multiple requests are received by a web application server from the same client browser for the same URL, the response provided to the client will be the result of the processing of the initial request carried out by the first (initial) thread allocated by the web application server. Results of the processing of the initial request are retained by the web application server and are sent to the client using the last opened connection between the client and server relating to the client's request for the URL. Processing of other threads is suspended and the threads are deallocated, at the earliest opportunity, where possible.

According to another aspect of the invention there is provided a computer program product including a computer usable medium tangibly embodying computer readable program code means implementable on a web application server system for receiving and processing an initial request for a URL from a client and for receiving a subsequent set of requests, the subsequent set of requests being for the URL and from the client, and being initiated before the completion of the processing of the initial request, the web application server system allocating an associated thread for each request received, each request received having a specified client-server connection, the computer readable program code means including:

> code means for processing the initial request to generate a result for communication to the client,
>
> code means for suspending the execution of the threads associated with the subsequent set of requests, and
>
> code means for, on termination of the processing of the initial request, utilizing the client-server connection specified for the last received request in the subsequent set of requests to communicate the result to the client.

According to another aspect of the invention there is provided the above computer program product, further including:

> code means for identifying the client by generating a client identifier in a cookie for communication to the client whereby the client will include the cookie in requests sent to the web application server system, and
>
> code means for identifying requests from the client by reading cookies for the client identifier.

According to another aspect of the invention there is provided the above computer program product, in which the code means for suspending the execution of the threads associated with the subsequent set of requests includes code means for placing each of the threads in a wait state prior to executing business logic for the associated request and further includes code means for deallocating the thread for the previously received one of the subsequent set of requests.

According to another aspect of the invention there is provided the above computer program product, further including code means for maintaining a response buffer in association with each request and in which the code means for communicating the result to the client includes means to transfer the result to the response buffer and means for ending the suspension of the thread associated with the last received request of the subsequent set of requests and for the thread to access the response buffer for communicating the result to the client.

According to another aspect of the invention there is provided a computer-implemented method for a web application server system for receiving and processing an initial request for a URL from a client and for receiving a subsequent set of requests, the subsequent set of requests being for the URL and from the client, and being initiated before the completion of the processing of the initial request, there being an associated thread in the web application server for each request received, each request received having a specified client-server connection, the method including the steps of:

> processing the initial request to generate a result for communication to the client,
>
> suspending the execution of the threads associated with the subsequent set of requests, and
>
> communicating the result to the client on termination of the processing of the initial request, utilizing the client-server connection specified for the last received request in the subsequent set of requests.

According to another aspect of the invention there is provided a computer-implemented method for a server to receive and process multiple requests from a client for a URL made using an HTTP protocol, including the steps of:

> receiving a first request for the URL from the client;
>
> allocating a first thread to process the first request and to generate a response;
>
> receiving, prior to the first thread generating a response, a subsequent set of requests for the URL from the client;
>
> allocating an associated thread for each one of the subsequent set of requests, each thread being executable to initiate a reply to the associated request by a specified connection to the client and using an associated response buffer, and for each newly allocated associated thread for the subsequent set of requests:
>
> generating a terminate event for any previously active associated thread for the subsequent set of requests,
>
> placing the newly allocated associated thread in a wait state to wait for an event,
>
> executing, following the generation of the response by the first thread, the following steps:
>
> transferring the response to the response buffer associated with the thread for the last request which is in a wait state,
>
> sending a handle response event to the thread associated with the last request which is in a wait state, whereby the indicated thread will wake up and reply to the client request with the contents of the associated response buffer, by the specified connection to the client of the associated request, and
>
> terminating the first thread.

According to another aspect of the invention there is provided a computer program product including a computer usable medium tangibly embodying computer readable program code means implementable on a web application server system, the computer readable program code means including code means for carrying out the steps of the above method.

According to another aspect of the invention there is provided a computer-implemented method for a web application server to receive and process multiple requests from a client for a URL made using an HTTP protocol, each request having an associated thread in the web application server and a specified client-server connection, the method including executing the following steps on the server for the associated thread for each request:

> creating, for the associated thread, a client context data object containing the URL, an identifier for a response object for the request, and a current thread identifier,
>
> obtaining a client identifier for the client, and saving the client identifier in association with the client context data object for the associated thread,
>
> determining if there is an outstanding request from the client by interrogating a globally accessible client table, the client table having entries for clients, each entry referencing the client identifier and the client context data object for the last received request,
>
> updating the client table to include the client identifier and the client context data object, thereby recording the request as the outstanding request for the client,
>
> in the case when there is an outstanding request from the client,
>
> sending a terminate event to the thread associated with the previously outstanding request, whereby any such thread other than the first such thread is woken from a wait state and deallocated, and
>
> determining if the previous request was for the same URL, and in such a case, putting the associated thread into a wait state to wait for an event, whereby when the associated thread receives a handle response event,
>
> the associated thread will clear the client table entry for the client, reply with the contents of the associated response buffer using its specified client-server connection and will be deallocated, and when the associated thread receives a terminate event, the thread will be deallocated in the case when there is no outstanding request or when the previous request was for a different URL:

executing the business logic associated with the request, upon completion of the execution of the business logic, determining if any new requests have been received from the client, in the case when no new request has been received, clearing the client table entry for the client and replying with the contents of the associated response buffer using the specified client-server connection of the request and deallocating the associated thread, in the case when a new request has been received, determining if the new request is for the URL of the request of the associated thread, and in the case when the new and current requests are for the same URL, sending a handle response event to the thread identified by the thread identifier in the data object specified by the client table, and in the case where the requests are for different URLs, deallocating the associated thread.

According to another aspect of the invention there is provided a computer program product including a computer usable medium tangibly embodying computer readable program code means implementable on a web application server system, the computer readable program code means including code means for carrying out the steps of the above method.

The present invention thus improves resource usage by the web application server. Multiple requests do not necessarily result in multiple redundant threads executing on the web application server. The web application server resources that would be otherwise allocated to those multiple threads are thus released. The present invention furthermore provides a server-side solution for handling multiple requests, so that handling of the requests is not dependent on the capabilities of the client program.

BRIEF DESCRIPTION OF THE DRAWINGS

In drawings which illustrate by way of example only a preferred embodiment of the invention.

DETAILED DESCRIPTION OF THE PREFERRED EMBODIMENT

Figure 1:
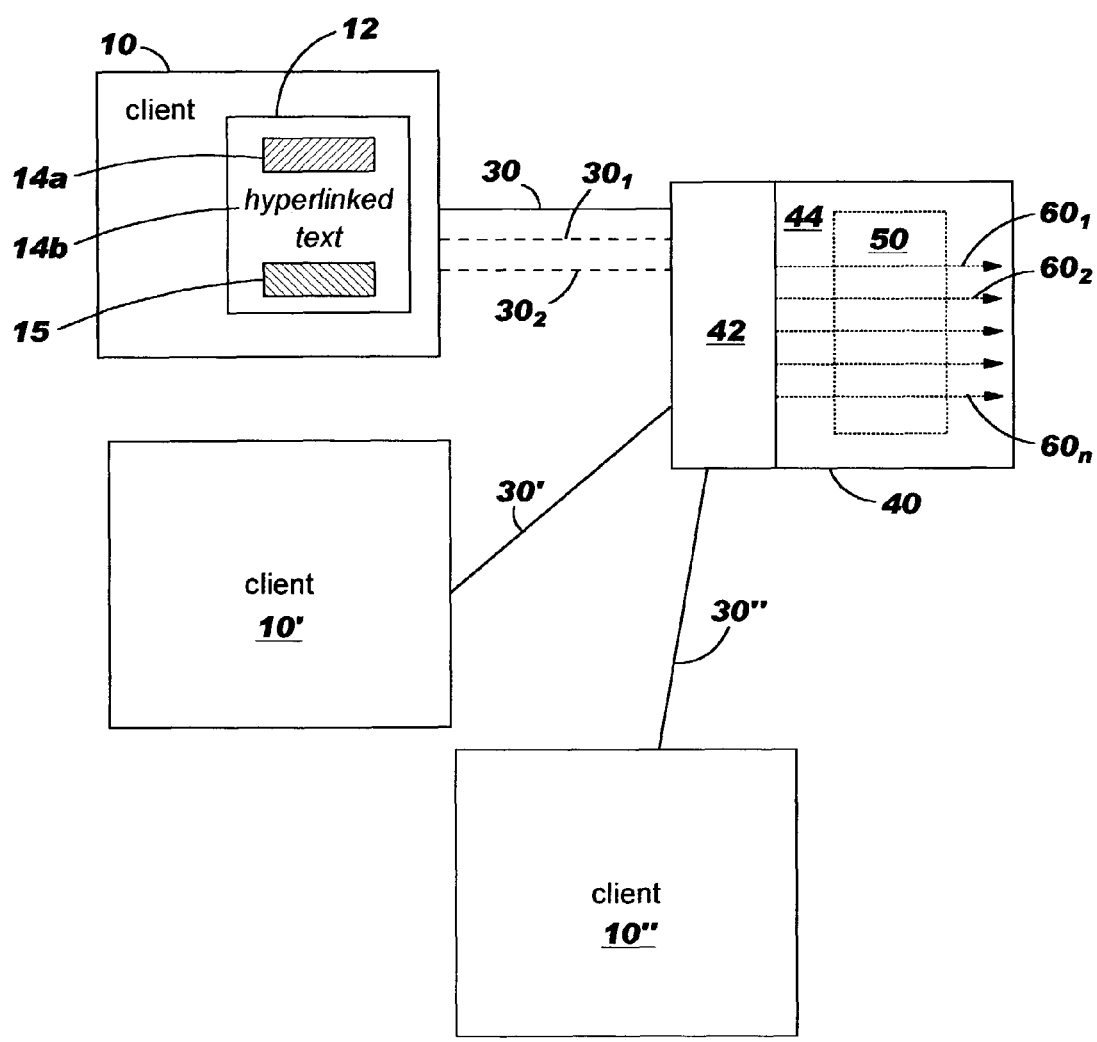
FIG. 1 is a block diagram of an example web client-server architecture in accordance with the preferred embodiment of the invention.

Referring to FIG. 1, a block diagram illustrates an example of the client-server architecture underlying the handling of multiple requests from a client according to the preferred embodiment. The client 10 typically runs on a user's personal computer and displays to the user a web page 12 which comprises information delivered from the web application server 40 in response to a client request (client 10 is typically a web browser or similar computer program product that establishes a connection to a web application server for requesting and receiving information from the web application server). The web application server 40 is a computer program product which receives and manages requests and responses to and from the client 10, and handles the initiation of logic processing required to provide responses to the client 10.

In the example of FIG. 1, the web page 12 includes at least one hyperlink or other means for submitting a request to the web application server 40. The hyperlink may be presented to the user in the form of a graphic, button, or text shown in FIG. 1 as 14a. FIG. 1 also shows an alternate text form 14b. If the first means for submitting a request 14a is provided in the form of a hyperlinked graphic, the web page may also include an alternate text means 14b for submitting the same request in the event that the client 10 is configured to display text only. The content of the requests that may be submitted through the use of 14a or 14b is identical; for example, in an e-commerce context, web page 12 could provide a shopping cart listing for the user, and the hyperlinks 14a, 14b could initiate a request for the checkout process, in which the user's credit card is charged for the purchase of the items in the shopping cart.

An additional means for initiating a request 15 (such as a hyperlink) is also present on the web page 12. The requests initiated through the use of this hyperlink 15 are different from the requests associated with the previous hyperlinks 14a, 14b. In the above e-commerce example, clicking on this hyperlink 15 could cancel the purchase or remove all items from the shopping cart.

The web application server 40 comprises a web server 42, and an application server 44, which are computer program products which respectively handle requests from the client 10 and the business logic required to process the requests (although this description uses the term "business logic", it will be understood that the term refers logic for all types of applications made available to the client by web application server 40). Application server 44 supports a web application 50. The web server 42 and the application server 44 are in communication with each other and operate together to fulfill the requests received from the client 10. Each request submitted to the web application server 40 by the client 10 is handled using standard HTTP (hypertext transfer protocol), such that each request from the client 10 is delivered to a designated port on the server 40, and the client 10 and the server 40 negotiate a port on which the client 10 waits for a response to its request. In this manner, a connection 30 is opened between the client 10 and the server 40. Once the response is received by the client 10, the connection 30 is closed. Each time a subsequent request is initiated by the client 10 for a response from the server 40, a new connection is opened between the client 10 and the server 40. If multiple requests are initiated by the client 10 while the client 10 is still awaiting responses from previous requests, then under HTTP the connections that were associated with the previous requests will be closed, and the server 40 will be unable to return the associated, previously requested, responses to the client 10.

In the example of FIG. 1, additional clients 10', 10" are shown running independently of the client 10, and may be in communication with the same web application server 40.

These additional clients 10', 10" may submit similar or identical requests to the server 40 as the first client 10.

The web server 42 receives the requests from the client 10, and will forward a response to the client 10 via the established connection 30. Where logic processing is required to fulfill a request (for example, to process a charge to a credit card, or to check inventory of items in a shopping cart), the request is passed by the web server 42 to the application server 44, which processes the business logic required to provide a response to the client 10 using the web application 50. Each time the application server 44 receives a request, an associated thread is allocated from a pool of threads maintained by the application server 44. According to the preferred embodiment, this thread is executed to respond to the associated request (one of threads $60_1, 60_2, \ldots 60_n$ in FIG. 1). Once the application 50 has finished business logic processing and produced information in response to the corresponding request, the corresponding thread in the set $60_1, 60_2, \ldots 60_n$ is deallocated. The resultant information is passed to the web server 42 as part of the response delivered to the client 10.

Figure 2:
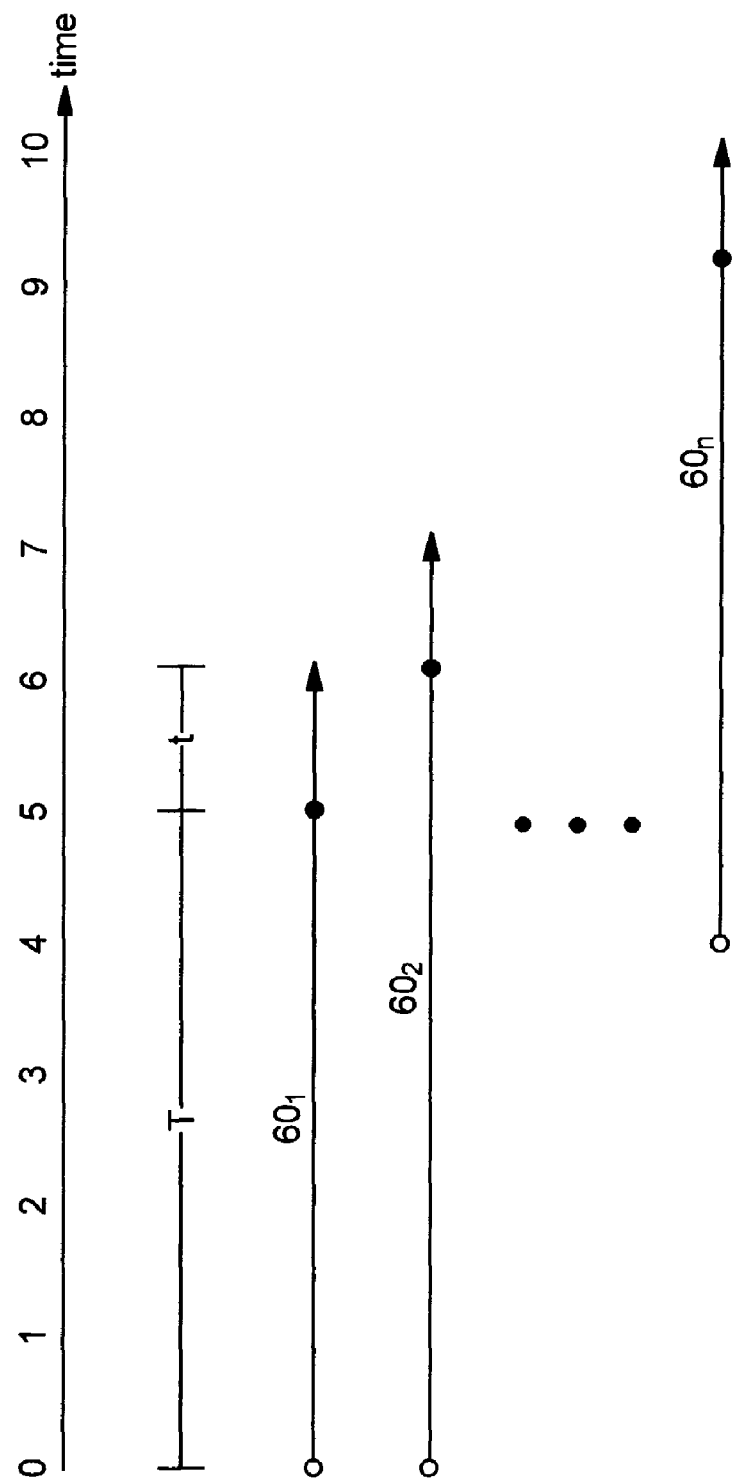
FIG. 2 is a timeline diagram showing example threads handled in accordance with the prior art.

Turning to FIG. 2, the handling of multiple requests from a single client 10 by prior art approach is shown according to a timeline. At time 0, a first request is received from the client 10, resulting in the allocation of a thread $60_1$ to execute the business logic required to provide a response to the first request. The time required for the web application 50 to carry out the business logic is indicated as time T. After time T, the time for the processing and delivery of the response is indicated as time t. The thread $60_1$ is deallocated at the end of time t.

FIG. 2 shows the client 10 transmitting a second, subsequent request for the same URL (for example, if the user double-clicks on the hyperlink 14a on the web page 12) before the web application server 40 is finished processing the first request. In accordance with HTTP, the first connection 30 associated with the previous request is closed, and a new connection is opened. The web server 42 will receive the second request, and transmit the request to the application server 44 so that the business logic can again be invoked to fulfill the request, resulting in the allocation of a new thread $60_2$. However, in the prior art, the web application server 40 will also continue to process the request on thread $60_1$ until it logically terminates, and will generate data in response to the first request. Because the first connection associated with the first request is closed, however, the continued processing of the first thread $60_1$ is a waste of the web application server 40 resources; the web server 42 will not provide a response to the client 10 using the result of the first thread $60_1$ (as its connection 30 is closed).

Similarly, for an nth identical request received from the client 10 before the previous threads up to $60_{n-1}$ are deallocated, these previous threads will likewise represent wasted resources since they will continue execution until the business logic is finished processing the earlier n-1th requests, although there will be no open connections to transmit the corresponding responses to the client 10. For requests having the same URL, the only remaining open connection to the client is the last connection opened. Therefore, the only response that can be transmitted back to the client 10 will be the response generated as a result of execution of thread $60_n$.

There are disadvantages associated with this standard HTTP method of handling multiple identical requests. First, there will be potentially significant wasted execution time and consumption of other computing resources during the redundant execution of the threads associated with requests that no longer have a connection to output a response.

Secondly, the business logic used by the web application 50 to process the request may alter the data stored on the web application server 40 such that it is no longer available for a second request. This would potentially result in an invalid response or may cause misleading information to be delivered to the client 10. For example, if the hyperlink 14a invoked a checkout or payment function which operated on the contents of a shopping cart, initiating the first thread $60_1$ may remove all items from the shopping cart as part of the business logic processed by the web application 50. If the user were to initiate a second, request for checkout or payment, during the processing of the second thread $60_2$ the web application 50 would find that there were no items in the shopping cart, and therefore return a response to the client 10 indicating that there was an error and that no payment was processed. The user might be inclined to enter items into the shopping cart again and attempt to invoke payment again. However, at the same time, the first thread $60_1$ would still be running, and would complete the logic necessary in order to effect payment.

Thirdly, there will be some additional delay before the response can be delivered to the client 10, as the server 40 must wait until the last thread $60_n$ terminates before providing the response, rather than waiting only until the first thread $60_1$ terminates. If d represents the network latency between the client and server, this may result in a total delay of less than 2d+nT+t before the client receives the result. For example, if the user clicked on the hyperlink 14a a first time, then clicked on the same hyperlink 14a a second time slightly less than T later, the user would have to wait for almost 2d+2T+t again before a response could be delivered to the client 10 since the web application must finish processing the second thread $60_2$ associated with the second request. If the user had clicked on the hyperlink 14a a third time, slightly less than T after clicking on the link 14a the second time, then the user would have to wait for almost 2d+3T+t before a response could be delivered to the client 10, instead of 2d+T+t.

The preferred embodiment provides a mechanism for avoiding certain of the undesirable effects that occur when multiple requests are received by a server from a client, as described above. The preferred embodiment provides that if multiple requests are received by a web application server from the same client browser with the same URL, the response provided to the client will be the result of the processing carried out by the first thread launched by the web application server. In the system of the preferred embodiment, the results of the initial thread are retained by the web application server and are sent to the client using the last opened connection between the client and server relating to the client's request for the URL. Only the thread associated with the first request carries out business logic processing. The other threads are suspended and deallocated prior to commencing business logic processing. The details of operation of the preferred embodiment are set out with respect to the examples shown with reference to FIGS. 1, 3, and 4.

Figure 3:
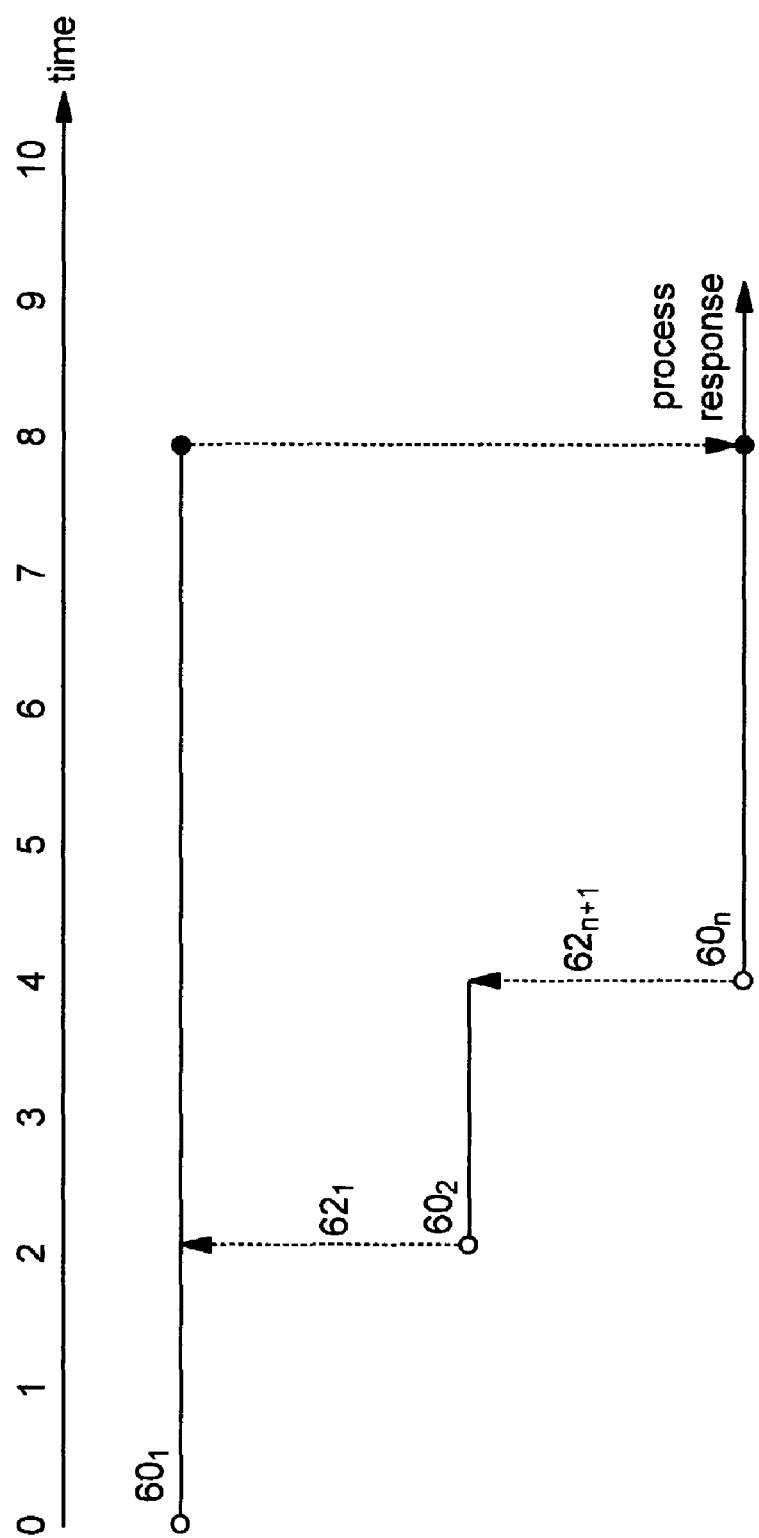
FIG. 3 is a timeline diagram showing example threads handled in accordance with the preferred embodiment of the invention.

Referring to FIG. 3, a timeline is shown for multiple requests received by the application server 40 from the client 10 and responded to by application server 40 in accordance with the preferred embodiment. When the first request is received, an associated thread $60_1$ is allocated by the web application server 40 to service this initial request, there is a specified connection $30_1$ opened between the client 10 and the server 40 for communication of the response to the associated request. In the preferred embodiment, each thread, such as thread $60_1$, has an associated response buffer where a response object is placed (or from which it referenced) prior to communicating the response to the client using web server 42 and the specified connection.

Before the time T required for the thread to finish processing the first request and terminate, a second request for an identical command is received from the client 10. The first connection $30_1$ between the client 10 and the server 40 is closed, and a new connection $30_2$ is opened for communication. However, before the second thread $60_2$ begins execution of the business logic for the second command, it determines if there is an outstanding request that is already being handled with a previous thread. If there is such a request, then a "terminate event" message $62_1$ is sent to the previous thread (in this case thread $60_1$) and the new thread, $60_2$, places itself in a "wait" state (no business logic processing is performed by the thread $60_2$). The first thread $60_1$, in the meantime, because it is not already in a "wait" state, ignores the "terminate event message" $62_1$ and continues processing in the web application 50.

Again, before the time T required for thread $60_1$ to finish processing the first request, an nth request for the same response is received from the client 10. The second connection $30_2$ between the client 10 and the server 40 is closed, and a new connection $30_n$ is opened for communication. Before the nth thread $60_n$ begins execution of the business logic for the nth request, it checks to see if there is an outstanding request that is already being handled with a previous thread. Because there is such a request, a "terminate event" message $62_{n-1}$ is sent to the previous thread, in FIG. 3 thread $60_2$. As the previous thread $60_2$ is already in a "wait" state, upon receipt of the "terminate event" message $62_{n-1}$ the thread $60_2$ is woken up and terminated (deallocated).

Thus, the first thread $60_1$ will continue its processing in the web application 50 until the business logic is finished; the result object is stored in, or referenced by, a response buffer on the web application server 40. The response object copied to the response buffer (or pointed to by the response buffer) is made available to the nth thread $60_n$, and the nth thread $60_n$ is woken up from its wait state so that it can return the response object to the web server 42 for transmission to the client 10 over the remaining open connection $30_n$.

It can thus be seen that at any given time, only two threads will run at once to service the multiple requests from the client 10, regardless of the number of times the request is received from client 10. The first thread will complete the business logic associated with the request; the last allocated thread will exist in a "wait" state until the business logic of the first thread is completed. Any additional threads which are allocated between the first and last request will be sequentially placed in a "wait" state, and woken up and deallocated as new threads are allocated in association with new requests. Each new thread is associated with a new request having a new specified connection between the web application server and the client. This process increases efficiency as the required business logic is executed only once, using the first allocated thread, rather than for all threads allocated for the multiple requests.

The system described above is capable of identifying multiple requests received by the server from the same client web browser. If an identical request is received from a different client (for example, client 10' or client 10?), then there is no need to invoke the wait-then-terminate event handling system, as there are open connections 30', 30? available to provide responses to those requests.

One means by which requests can be associated with a given client 10 is through the use of synchronization data which is provided by the server 40 to the client 10, and passed by the client 10 back to the server 40 with subsequent requests. This synchronization data may consist of a persistent state object, such as a cookie. Implementation of cookies in HTTP is known in the art. On the first request of a client 10 to the server 40, the server 40 checks the request to determine if it has an associated cookie. If no cookie value is present in the request, then the server 40 issues a cookie to the client 10 as part of the first response. This cookie would thereafter be passed by the client 10 to the server 40 with any subsequent requests. Preferably, the value of the cookie is composed of at least a uniquely generated number which acts as a client identifier, or at least a sufficiently unique number or code to identify the client 10. The uniquely generated number may be combined with further information to identify the session, as required.

Requests may be associated with a particular client 10 using other means. For example, each link or button 14a, 14b which is clicked or activated by the user to spawn a request from the client 10 to the server 40 may be encoded with a unique token or other identifier, such that the URL of every request submitted by the client 10 is encoded with that token.

Figure 5:
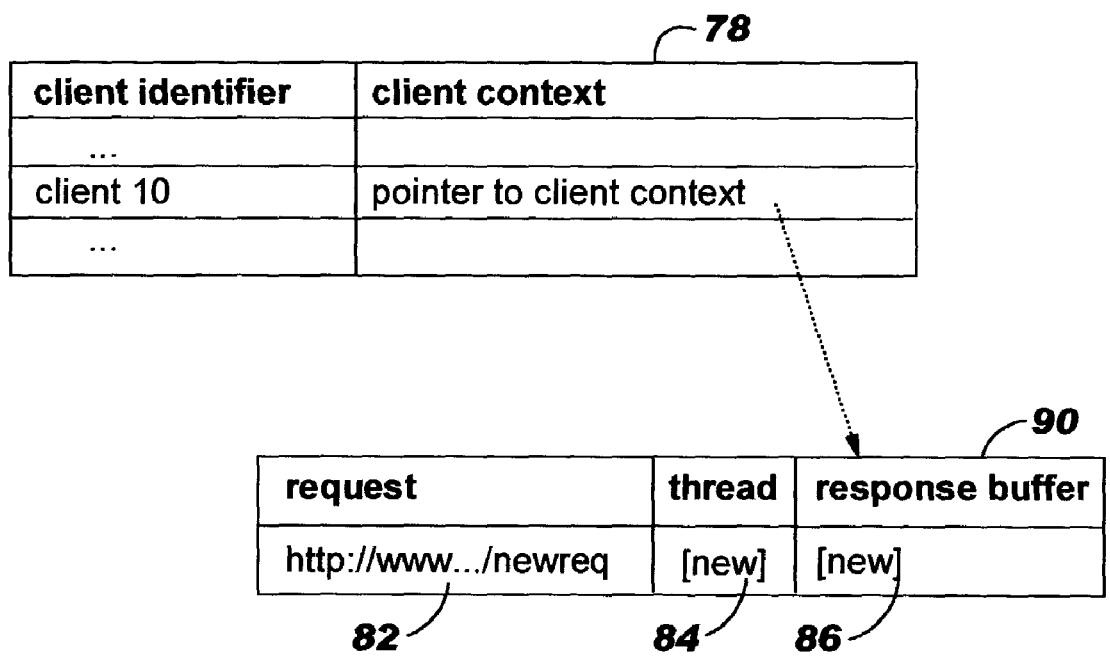
FIG. 5 is another block diagram showing a further example client table and client context object according to the preferred embodiment.
Figure 6:
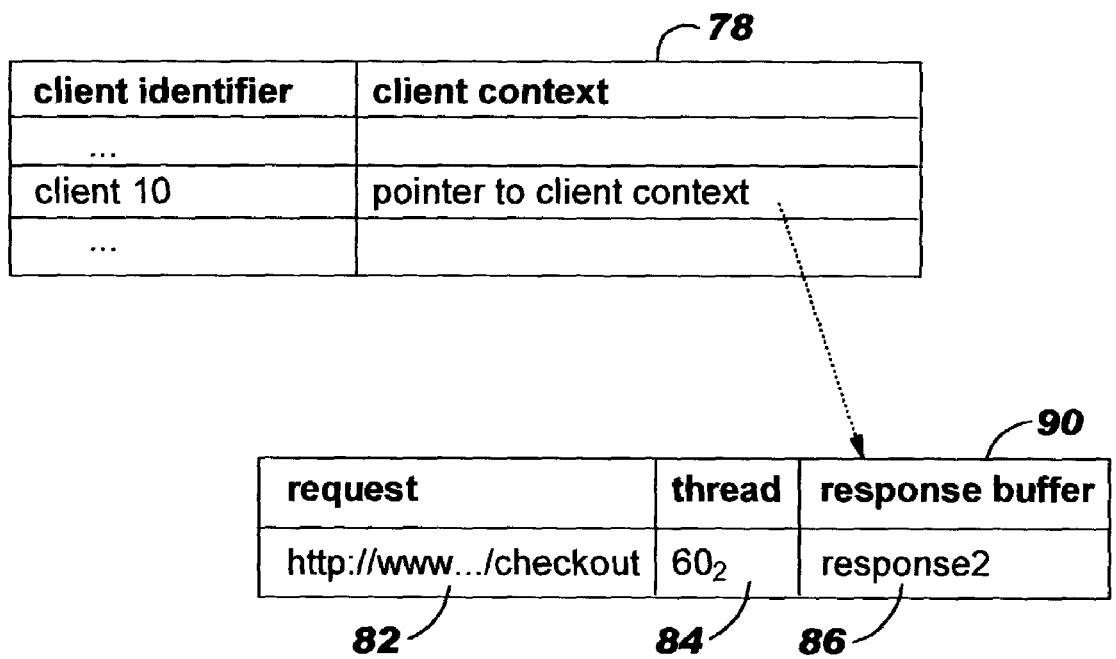
FIG. 6 is a further block diagram showing a further example client table and client context object according to the preferred embodiment.

In the preferred embodiment, the web application server 44 maintains client context data structures for client identifiers, requests, threads and response buffers. Example data for a table 78 and a client context object 90 for the last request received from the client is shown in FIGS. 4 through 6.

As is described above, once the web application server 40 has delivered a cookie to client 10, each subsequent request from the client 10 will include the cookie and thus allow the server 40 to identify the source of each request. The server 40 maintains a table 78 which associates each client identifier (the value of the cookie) with a pointer to the most recent client context object 90 maintained for the client 10.

Figure 4:
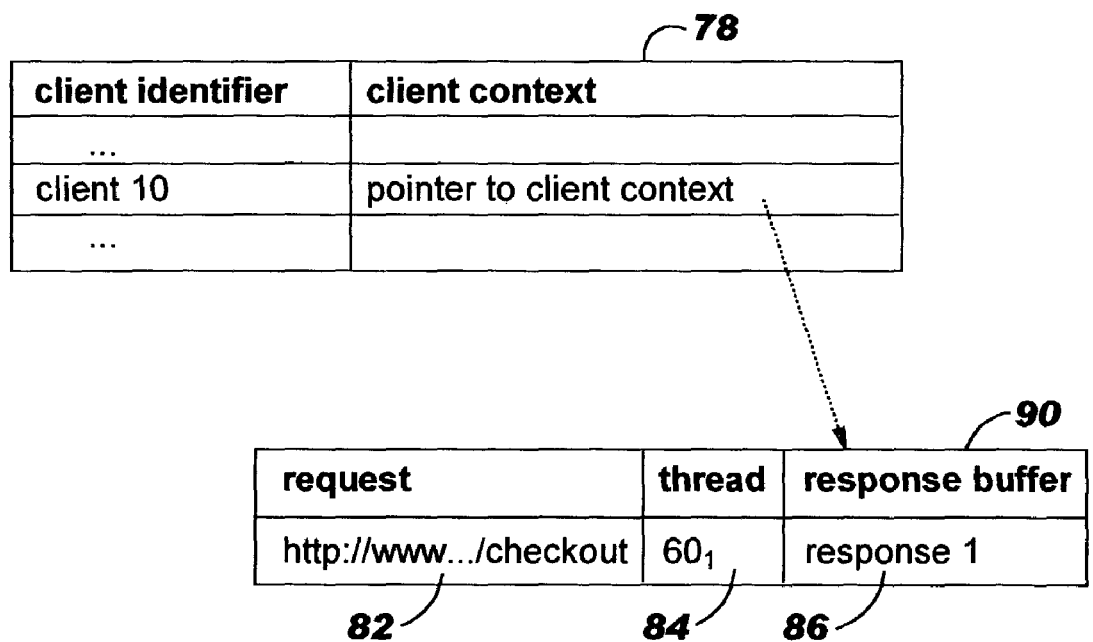
FIG. 4 is a block diagram showing an example client table and client context object according to the preferred embodiment.

As is the case for each thread, FIG. 4 shows a client context object 90 for client 10 which identifies:
 a. in element 82, the HTTP request (command) submitted by the client 10 (in FIG. 4, "http://www.../checkout"),
 b. in element 84, the identifier of the thread (in the example of FIG. 4, the identifier is $60_1$),and
 c. in element 86, the identifier for the response buffer which stores a reference to the data for the response to the request, also referred to as a response object (in FIG. 4, response 1).

Other information may also be maintained in the client context object 90 by the server 40 in addition to this data.

If, while a previous request is being processed for the first request from client 10, the client 10 submits a new request which is different from the previous request, a new client context object 90 is created to reflect the new thread, response buffer, and the new request ("http://www.../newreq" in FIG. 5). The pointer to the client context object in the table 78 is updated with a pointer to the newly defined client context object 90 for the thread.

Alternatively, the client 10 may submit a repeated request for the same command, as reflected in the data structures shown in FIG. 6. Again, a new client context object 90 is created for the new thread, and table 78 is updated for the client 10 entry to point to this new client context object 90.

Figure 7:
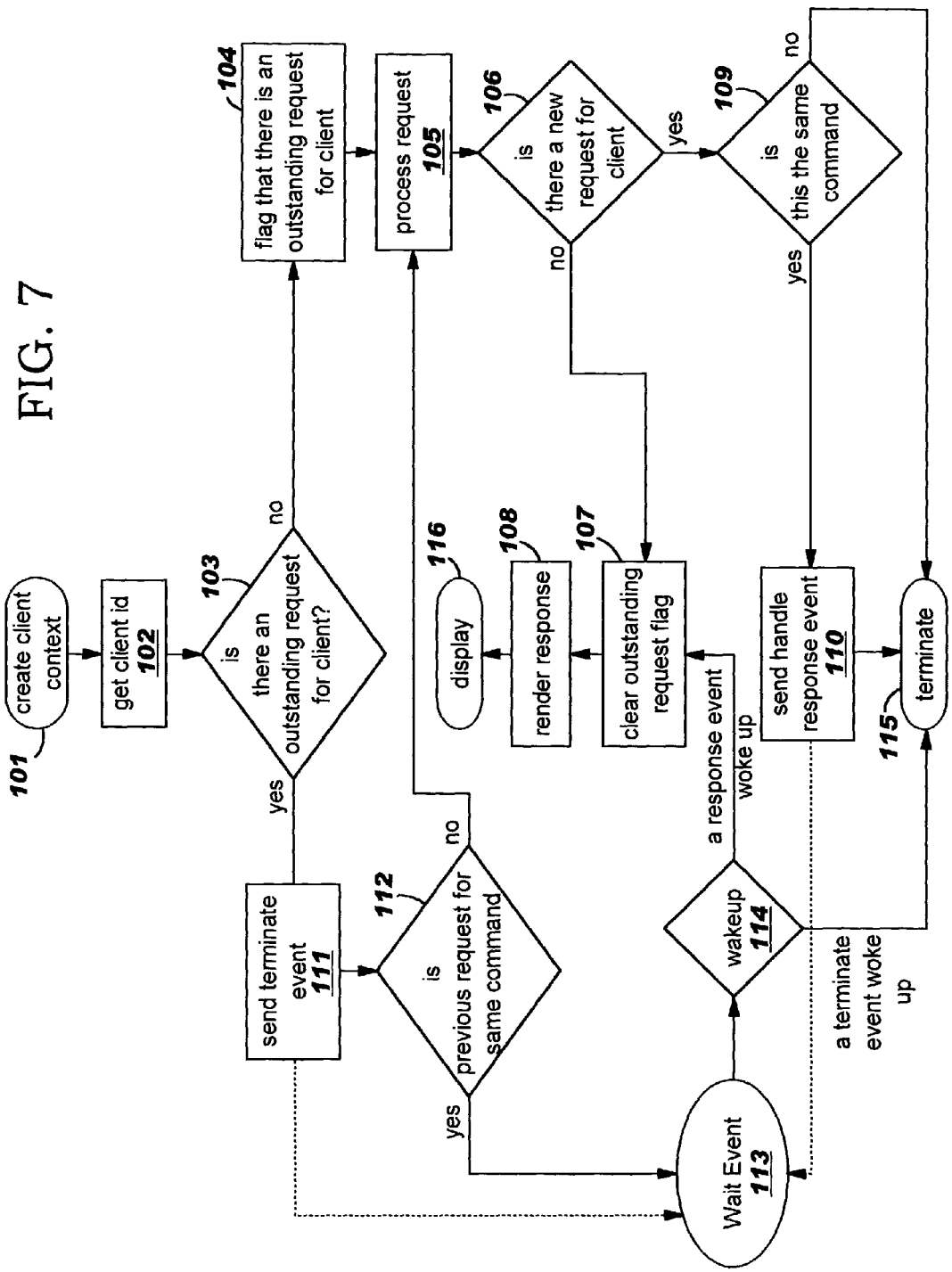
FIG. 7 is a flowchart showing thread execution in the web application server in accordance with the preferred embodiment.

The process of handling multiple requests from a client 10 is outlined in greater detail in the flowchart of FIG. 7. The flowchart show the execution path of threads associated with requests received by web application server 40.

When a request is received by the server 40 from the client 10, a thread 60 is allocated by the application server 44 to execute the application 50. The thread retrieves the client identifier (from the cookie, in the preferred embodiment) from the request, if one is available. If there is no client identifier, then the server 40 will generate an identifier and send it to the client 10 for use in subsequent requests. A client context object 90 is created for the newly allocated thread. These steps are represented by boxes 101 and 102 of the flowchart of FIG. 7.

Upon receipt of the request from the client 10, the associated thread determines if there is already an outstanding request from the same client 10 (decision box 103) by checking the entry in the table 78 for a previous client context object. If there is no outstanding request (the client 10 is not listed in table 78), then the current request is flagged as the outstanding request for the client 10 by writing the pointer to the client context object 90 to the client's entry in table 78 (box 104). If there is an outstanding request for the client 10, then the current thread sends a "terminate event" to the thread associated with the previously outstanding request (box 111), then determines (using the table 78 and the client context object 90) whether the previous request was for the same command as the current request (decision box 112). If the previous request was for the same command, then the thread allocated to the current request is placed in a wait state to wait for a further event (box 113).

A thread not terminated (deallocated) or placed in a "wait" state (in the preferred embodiment, the initial request's associated thread) executes the business logic associated with the request (box 105). Upon termination of the business logic processing, the thread determines whether any new requests have been received from the client 10 by checking the client context object 90 currently pointed to by the table 78 (decision box 106). If the thread in the client context object 90 (thread identifier 84) is different from the currently executing thread, then there has been a new request. If no new request has been received, then the outstanding request flag is cleared by removing the client 10 from the table 78 (box 107), and the necessary display logic processing is performed on the current thread to render a response to the client 10 using the thread's response (boxes 108 and 116).

If a new request had been received from the client 10, then the thread determines whether the new request is for the same URL as the current request (decision box 109) by comparing the request identifier with the request stored in the object 90, pointed to by the client entry in the table 78. If the new request is for the same URL, then a "handle response event" is sent to the thread which had been placed in a wait state (box 110), such that the waiting thread wakes up and replies to the current request with the contents of the associated response buffer (boxes 114, 107, 108, and 116). The current thread first places the response object in the response buffer for the thread that is to be sent the handle response event.

If the new request is not for the same command, then the thread is terminated.

By this means, the business logic is efficiently processed by using the logic processing of the thread 60 associated with the first request The response is copied to the response buffer for the thread having derived to the last open specified connection (associated with the last request). This avoids any delays that would have been incurred by delaying processing until the commencement of subsequent intermediary threads. Business logic processing by threads associated with requests having closed connections to the client is avoided. Furthermore, all code implementing the logic required to handle multiple requests may be located on the server 40, rather than on the client 10.

Various embodiments of the present invention having been thus described in detail by way of example, it will be apparent to those skilled in the art that variations and modifications may be made without departing from the invention. The invention includes all such variations and modifications as fall within the scope of the appended claims.

The embodiments of the invention in which an exclusive right or privilege is claimed are described as follows:

1. A method of processing multiple client requests for data at a server, the method comprising:
   allocating a first thread responsive to receiving a client request for data from a client;
   executing the first thread to generate a response to the client request;
   allocating a second thread responsive to receiving a subsequent instance of the client request;
   determining if a currently suspended thread was allocated after the first thread began executing and before the second thread was allocated responsive to receiving an instance of the client request; and
   if the currently suspended thread was allocated after the first thread began executing and before the second thread was allocated, generating a terminate event message to terminate the currently suspended thread;
   suspending the second thread if the first thread is already generating the response;
   waking the second thread after the first thread has generated the response to the client request; and
   sending the response generated by the first thread to the client using the second thread.

2. The method of claim 1 further comprising:
   generating a cookie to send to the client, the cookie including a client identifier;
   receiving the cookie from the client; and
   identifying the client using the client identifier in the received cookie.

3. The method of claim 1 wherein suspending execution of the second thread comprises placing the second thread in a wait state prior to executing the second thread.

4. The method of claim 1 further comprising opening a first communication path with the client responsive to receiving the client request, and opening a second communication path with the client responsive to receiving the subsequent instance of the client request.

5. The method of claim 1 wherein the second thread is allocated after the first thread begins executing.

6. The method of claim 3 further comprising deallocating the first thread.

7. The method of claim 3 further comprising the first thread storing the response to the client request in a buffer at the server.

8. The method of claim 4 wherein sending the response generated by the first thread comprises executing the second thread to retrieve and send the response generated by the first thread to the client over the second communication path.

9. The method of claim 7 wherein waking the second thread comprises waking the second thread from the wait state, and further comprising executing the second thread to retrieve the buffered response and to send the buffered response to the client.

10. A non-transitory computer readable medium for a computing device, the computer readable medium having logic stored thereon, that, when executed by the computing device, controls the computing device to:
    allocate a first thread responsive to receiving a client request for data from a client;
    allocate a second thread responsive to receiving a subsequent instance of the client request for data;
    determine if a currently suspended thread was allocated after the first thread began executing and before the second thread was allocated responsive to receiving an instance of the client request; and
    if the currently suspended thread was allocated after the first thread began executing and before the second thread was allocated, generate a terminate event message to terminate the suspended thread;

suspend the second thread if the first thread is already generating a response to the client request;

wake the second thread after the first thread has generated the response; and return the response generated by the first thread to the client using the second thread.

11. The computer readable medium of claim 10 wherein the logic is further configured to control the computing device to:

generate a cookie to send to the client, the cookie including a client identifier;

receive the cookie from the client; and identify the client using the client identifier in the received cookie.

12. The computer readable medium of claim 10 wherein the logic is further configured to control the computing device to suspend the execution of the second thread by placing the second thread in a wait state.

13. The computer readable medium of claim 10 wherein the logic is further configured to control the computing device to store the response generated by the first thread in a buffer associated with the first thread.

14. The computer readable medium of claim 10 wherein the logic is further configured to control the computing device to send the response generated by the first thread over a communication path associated with the second thread.

15. The computer readable medium of claim 12 wherein the logic is further configured to control the computing device to generate a message to deallocate the first thread while the first thread is generating the response.

16. The computer readable medium of claim 13 wherein the logic is further configured to control the computing device to wake the second thread from a wait state to retrieve the response from the buffer associated with the first thread, and to send the response to the client.

* * * * *